United States Patent Office 2,803,616
Patented Aug. 20, 1957

2,803,616

METHOD OF PREPARING ORGANOPOLY-SILOXANES

Harold A. Clark, Midland, Mich., assignor to Dow Corning Corporation, Midland, Mich., a corporation of Michigan No Drawing. Application June 24, 1954,
Serial No. 439,133

2 Claims. (Cl. 260—33.6)

This invention relates to a method of preparing organopolysiloxanes and to the products so prepared.

It is known that organosilicon compounds can be incorporated into various organic resins in order to improve various properties of the latter such as dielectric strength, water absorption, thermal stability, gloss and many others. One of the difficulties which has been encountered is that of incompatibility between the organosilicon compounds and organic resins. This incompatibility often prevents incorporation of pure organopolysiloxanes in the organic resin. Often the incorporation may be carried out by means of a mutual solvent but this often necessitates the subsequent removal of the solvent from the finished product. Such removal is an added expense and if the solvent is not removed, it may cause detrimental effects in the organic resins.

For example if the organosilicon compound is to be incorporated in a vinylic resin, that is, a resin containing a C—C unsaturated linkage, the presence of non-vinylic solvent may interfere with the polymerization or setting of the vinylic resin.

Another difficulty which has been encountered in the incorporation of organopolysiloxanes in organic resins, particularly those of the polar type such as polyesters, has been the necessity of obtaining high hydroxyl content in the organopolysiloxane in order to obtain sufficient compatibility with the polar organic resins. Consequently if the organosilicon resin is prepared say by hydrolysis of the corresponding hydrolyzable silanes in the heretofore employed solvents such as alcohols, ethers, petroleum naphthas, benzene, toluene, and chlorinated aliphatic and aromatic solvents, and the solvents are subsequently removed prior to addition to the polyester resin, the resulting polysiloxane would have a substantially reduced hydroxyl content and therefore would be incompatible with the polyester resin.

It is an object of this invention to provide a method of preparing polysiloxanes which will allow them to be used without further modification in organic resins. Another object is to provide a combination of solvent and organopolysiloxane which will obviate the necessity of removing any solvent before or after incorporation into an organic resin. Another object is to prepare an organosilicon composition, one component of which can be copolymerized with organic vinylic resins. Another object is to provide a novel composition of matter which is useful in modifying organic resins in order to improve thermal stability, weatherability, electrical properties and water absorption of the organic resins.

In accordance with this invention silanes of the formula $R_nSiX_{4-n}$ where R is a monovalent hydrocarbon radical or halogenated monovalent hydrocarbon radical, $n$ has an average value from 1 to 2 inclusive and X is a hydrolyzable group, are hydrolyzed in a phenylethylene in amount so that the hydrolysis product is in solution in the phenylethylene and the phenylethylene solution of the hydrolysis product is thereafter separated from the aqueous phase and any hydrolysis by-product.

The term "hydrolysis by-product" as employed herein has reference to the materials obtained by removing the X groups from the silicon with water, for example, HCl, alcohol, ammonia and the like.

The term "a phenylethylene" as used in the specification and claims includes styrene and its equivalents, alphamethylstyrene, chlorostyrene, bromostyrene, vinyltoluene, divinylbenzene and mixtures thereof.

The hydrolysis of this invention can be carried out by adding a hydrolyzable silane or a mixture of hydrolyzable silanes to a mixture of the phenylethylene and water. In general the hydrolysis is carried out at temperatures below the reflux temperature of the phenylethylene although the precise temperature of the hydrolysis is not critical. During hydrolysis it is best to employ a polymerization inhibitor for the phenylethylene such as t-butylcatechol. Alternatively, the hydrolysis may be carried out by adding water to a phenylethylene solution of the hydrolyzable silane.

If desired, minor amounts of other solvents may be present in order to assist in the hydrolysis of the hydrolyzable silanes. For example, when hydrolyzing silanes which have greatly different rates of hydrolysis it is often desirable to employ alcohol in order to retard or prevent gellation of the more easily hydrolyzed silane.

After hydrolysis has been completed the aqueous layer is separated from the phenylethylene layer and the phenylethylene layer is separated from any remaining hydrolysis by-product. This may be done by washing with water or by distilling out the by-product.

Any monovalent hydrocarbon substituted or halogenated monovalent hydrocarbon substituted hydrolyzable silane can be employed in the process of this invention. The hydrolyzable groups, X radicals, can be any hydrolyzable groups such as halogen, hydrocarbonoxy, acyloxy amino, and sulfide. Specific examples of operative silanes are methyldichlorosilane, vinylphenyldiethoxysilane, diphenyldiacetoxysilane, phenylmethylsilazanes, octadecyltrichlorosilane, cyclohexyldichlorosilane, methyldichlorosilane, chlorophenylmethyldichlorosilane, trifluoromethylphenyltrifluorosilane, bromoxenyltrichlorosilane, and tolylmethyldichlorosilane. It is to be understood that any combination of the above type silanes or any combination of the above type silanes with unsubstituted silanes such as silicon tetrachloride, ethylsilicate and trichlorosilane or silanes of the formula $R_3SiX$ may be employed provided the average number of hydrocarbon or halogenated hydrocarbon groups to silicon in the mixture is from 1 to 2 inclusive.

The relative proportions of the phenylethylene to hydrolyzable silanes is not critical in the method of this invention. Obviously, sufficient of the phenylethylene should be employed in order to keep in solution all of the hydrolysis product, that is, the polysiloxanes formed during the hydrolysis. In practice the amount of the phenylethylene may range from 1 to 99% by weight of the finished product.

The products of this invention comprise polysiloxanes of the formula $$R_nSiO_{\frac{4-n}{2}}$$

where R and $n$ are as above defined, dissolved in the phenylethylene. These solutions are stable and may be stored for prolonged periods of time. They can be incorporated directly into organic resins and are particularly adaptable for use in vinylic resins.

The following examples are illustrative only and should not be construed as limiting the invention which is properly set forth in the appended claims. All parts in the following examples are parts by weight unless otherwise specified.

Example 1

A mixture of 323 parts of methyltrichlorosilane, 740 parts of phenyltrichlorosilane, 258 parts of dimethyldichlorosilane and 506 parts of diphenyldichlorosilane were added to a mixture of 954 parts styrene which contained a small amount of t-butylcatechol and enough water to give 17.7% by weight HCl in the aqueous layer. The hydrolysis mixture was maintained at 83° C. during addition of the chlorosilanes. After hydrolysis was complete the acid layer was separated and the styrene layer was neutralized by the addition of calcium carbonate and thereafter filtered through diatomaceous earth. The resulting solution contained 55% by weight of the copolymeric siloxane resin.

Varying amounts of this solution were added to a maleic anhydride polyester resin in amounts varying from 1 to 50% by weight polysiloxane based on the weight of the total composition. The mixture was then cured and in all cases a compatible film was obtained. This film showed improved heat stability, moisture resistance and gloss over films containing no polysiloxane resin.

Example 2

1915 parts of butyltrichlorosilane were added to 1090 parts styrene together with enough water to give about 18% by weight HCl in the aqueous phase. The temperature during hydrolysis was about 82° C. When hydrolysis was complete the aqueous layer was separated and the styrene solution neutralized with calcium carbonate and filtered through diatomaceous earth. The resulting solution contained 50% by weight monobutylpolysiloxane resin.

This solution is suitable for incorporation in polystyrene resins by adding the desired amount to styrene monomer or partially polymerized liquid polystyrene and then polymerizing the styrene in the usual manner to solid products.

Example 3

A mixture of 619 parts of dimethyldichlorosilane, 677 parts of phenyltrichlorosilane and 299 parts of methyltrichlorosilane was added to a mixture of 736 parts styrene and water. The water was present in amount sufficient to give 18% by weight HCl in the aqueous layer. During hydrolysis the temperature was maintained from 83–85° C. After hydrolysis was complete the layers were separated and the styrene layer was neutralized as in Example 1.

This styrene solution of the copolymeric polysiloxane is suitable for use in organic resins.

Example 4

Equivalent results are obtained when equal molar amounts of dimethyldichlorosilane, chlorophenyltrichlorosilane, and vinyltrichlorosilane are hydrolyzed in styrene in the manner of Example 1. The resulting styrene solution of the copolymeric siloxane is suitable for incorporation in organic resins.

That which is claimed is:

1. The method which comprises hydrolyzing a silane of the formula $R_nSiX_{4-n}$ where R is selected from the group consisting of monovalent hydrocarbon radicals and halogenated monovalent hydrocarbon radicals, X is a hydrolyzable group and n has an average value from 1 to 2 inclusive, in a phenylethylene of the group consisting of styrene, α-methylstyrene, chlorostyrene, bromostyrene, vinyltoluene and divinylbenzene in amount so that the hydrolysis product is in solution in the phenylethylene and thereafter separating the phenylethylene solution from the aqueous phase and from any hydrolysis byproducts.

2. A solution of a polysiloxane in a phenylethylene selected from the group consisting of styrene, α-methylstyrene, chlorostyrene, bromostyrene, vinyltoluene and divinylbenzene prepared in accordance with claim 1.

References Cited in the file of this patent

UNITED STATES PATENTS 2,607,755   Bunnell _____ Aug. 19, 1952